(No Model.)
H. V. MILLER.
SPRING TOOTH HARROW.
No. 444,248. Patented Jan. 6, 1891.
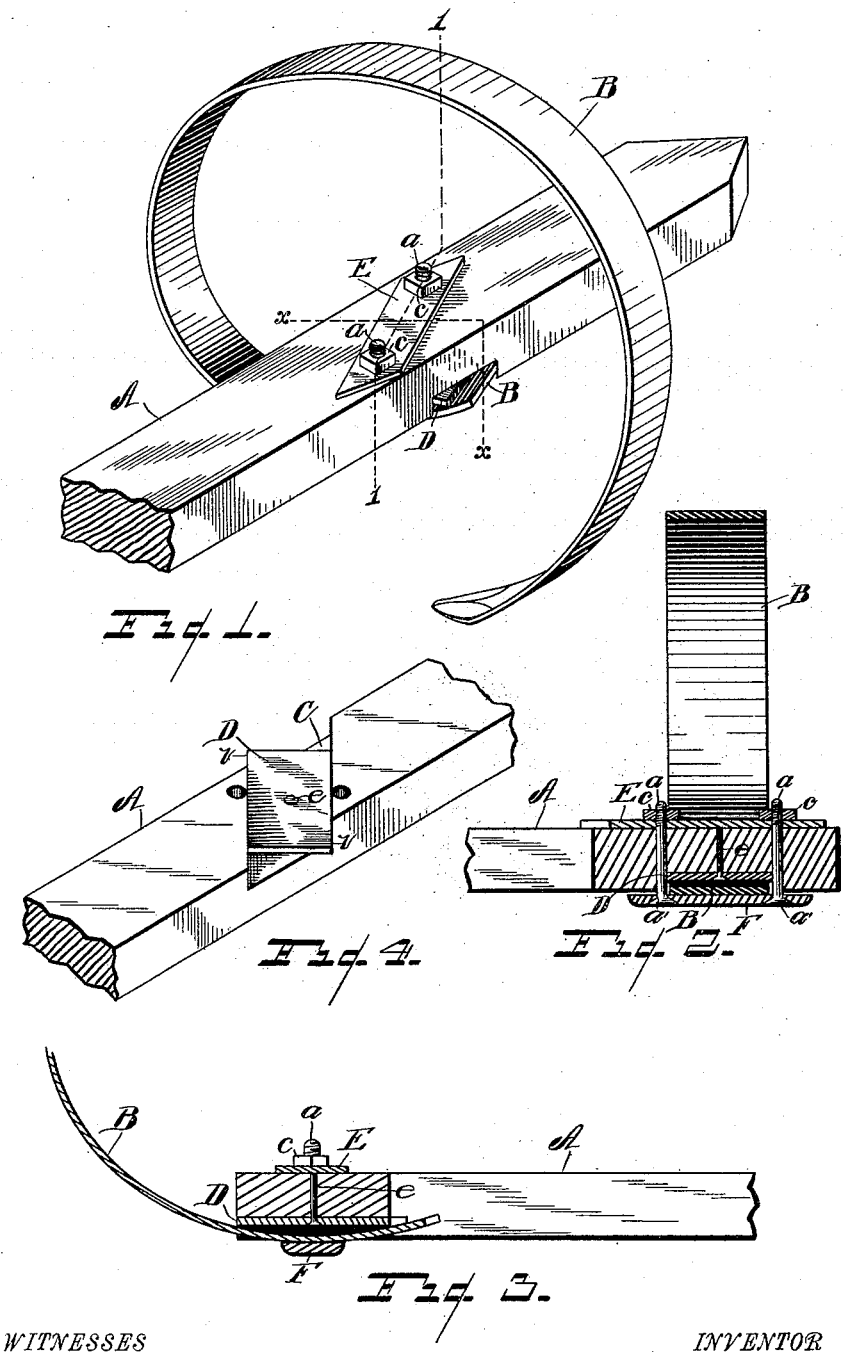

UNITED STATES PATENT OFFICE.

HUSON V. MILLER, OF JONESVILLE, MICHIGAN.

SPRING-TOOTH HARROW.

SPECIFICATION forming part of Letters Patent No. 444,248, dated January 6, 1891.

Application filed May 24, 1890. Serial No. 353,036. (No model.)

*To all whom it may concern:*

Be it known that I, HUSON V. MILLER, a citizen of the United States, residing at Jonesville, in the county of Hillsdale and State of Michigan, have invented certain new and useful Improvements in Spring-Tooth Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to spring-toothed harrows, and particularly to the manner of securing the teeth to the cross-beams of the harrow-frame, which will be fully hereinafter set forth, and the essential features of the device pointed out particularly in the claims.

In the accompanying drawings, forming a part of the specification, Figure 1 is a perspective view showing a tooth secured in a cross-beam of the harrow-frame. Fig. 2 is a section on dotted line $l\,l$ of Fig. 1. Fig. 3 is a section on dotted line $x\,x$ of Fig. 1. Fig. 4 is a view of the under face of the cross-beam, showing the channel crossing the face of the beam diagonally, and the metal bearing-plate located in said channel.

Referring to the letters of reference, A indicates a cross-beam of the harrow-frame, having in its under face a channel C, with the metal bearing-plate D located therein, as shown in Fig. 4, and which is secured by means of the pin $e$.

The tooth B is the ordinary spring-tooth, and is adapted to lie in the channel C, its upper face bearing against the plate D, the tooth being secured in said channel by means of the clip F and bolts $a\,a$. The clip F crosses the under face of the tooth transversely, and is held in place by the bolts $a\,a$, that pass through said clip and beam A, and through the plate E on the upper face of said beam, said bolts receiving on their upper ends the nuts $c\,c$, as clearly shown in Figs. 1, 2, and 3. The heads of the bolts $a\,a$ are countersunk in the clip F, as shown at $a'\,a'$ in Fig. 2, and the edges of said clip are beveled or rounded off, as shown in Figs. 2 and 3, so as to pass freely over the soil. By tightening the nuts $c\,c$ the clip is drawn firmly against the under face of the tooth, forcing said tooth against the plate D and securely clamping it within the channel of the beam A, as shown in Figs. 1 and 3. The tooth may be adjusted in the channel C to give the point thereof an increased or decreased dip in the soil by loosening the nuts $c$, which releases the clip F and permits of the adjustment of the tooth as desired, and when so adjusted the tooth may be again secured by tightening said nuts, as before described.

It will be seen that the ends of the bearing-plate D are square, and that one corner $v$ of each end of said plate extends beyond the edge of the beam A, thus affording a squarely transverse bearing across the plane of the tooth B, thereby obviating the twisting of the tooth, as would be incident if the ends of the plate D crossed the plane of the tooth obliquely on a line with the edge of the beam A, as will be readily understood. It will also be seen that the tooth being confined between the upper plate D and the lower plate or clip F is securely fastened and prevented from working loose by its rapid vibration or from moving laterally within the channel.

Having thus fully set forth my invention, what I claim as new, and desire to secure by Letters Patent, is—

1. In combination with the harrow-beam having the channel in its under face, the metal plate in said channel, the spring-metal tooth below said plate, the clip crossing the under face of the tooth, with bolts passing through the clip and harrow-beam, substantially as specified.

2. The harrow-beam having the channel crossing its under face, combined with the square metal plate in said channel, the pin passing through said plate into the harrow-beam, the spring-metal tooth, the clip crossing the under face of said tooth, the metal strap crossing the upper face of the harrow-beam, the bolts passing therethrough and through the clip, and nuts on the upper ends of said bolts, as and for the purposes set forth.

In testimony whereof I affix my signature in presence of two witnesses.

HUSON V. MILLER.

Witnesses:
E. B. MILLER,
VICTOR HAWKINS.